May 23, 1967 G. KRAUSE 3,321,574

CLAMPING CIRCUIT ARRANGEMENT FOR COLOR TELEVISION SIGNALS

Filed April 27, 1965

Inventor:
Gerhard Krause by Michael J. Striker
Attorney

United States Patent Office 3,321,574

Patented May 23, 1967

3,321,574

CLAMPING CIRCUIT ARRANGEMENT FOR COLOR TELEVISION SIGNALS

Gerhard Krause, Darmstadt, Germany, assignor to Fernseh GmbH, Darmstadt, Germany Filed Apr. 27, 1965, Ser. No. 451,141

Claims priority, application Germany, Apr. 29, 1964, F 42,745

5 Claims. (Cl. 178—5.4)

This invention concerns a circuit arrangement for clamping color television signals during the presence of color synchronizing signals and solves the problem of making it possible with simple means to fix the potential of the blanking level of a color television signal without deleteriously affecting the color synchronizing signals transmitted during the blanking intervals.

As is known, in color television signals used in the NTSC and similar systems the color synchronizing signal is transmitted during that portion of the horizontal blanking interval following the synchronizing signal, the so-called "back porch." This post synchronizing blanking level, the duration of which amounts as a rule to 9 percent of the line duration, is taken up for the most part by the color synchronizing signal, which may consist, for example, of twelve cycles of an oscillation of the color sub-carrier frequency which may be 4.3 mc./s. During those periods in which the clamp circuit is operative the signal lead is held at a reference potential, with the result that the color synchronizing signal is attenuated to an inadmissible extent.

The way of avoiding this difficulty which consists in making the clamping circuit operative only after the termination of the color synchronizing signal requires not only very accurate timing of the clamp drive pulses, but also restricts their duration, which thus becomes too short to ensure satisfactory performance of the clamp circuit. In addition, the timing of the clamp drive pulses must be changed during the vertical synchronizing signals.

It has previously been proposed to avoid impermissible attenuation of the color synchronizing signal through the operation of the clamp circuit during the period of the back porch by interposing between the signal circuit and the clamp circuit a rejector circuit tuned to the frequency of the color sub-carrier. It has also been proposed to replace the rejector circuit by a resistive impedance in order to avoid the occurrence of undesirable resonances within the video frequency band between the inductance of the rejector circuit and stray circuit capacitances. This means has proved little successful, because it affected the functioning of the clamp circuit.

It is therefore an object of the invention to provide a clamp circuit arrangement combining accurate timing with very low attenuation of the synchronizing signal.

According to the present invention a clamp circuit arrangement for color television signals includes switch means operable to connect a point in a signal lead to a reference potential and includes also circuit means comprising only passive elements for causing signal components of color sub-carrier frequency to appear with approximately the same amplitude and phase at both terminals of said switch means.

A clamp circuit according to the invention possesses the advantage that the color synchronizing signal is not attenuated during those periods in which the clamp is operative, but remains at its full amplitude. It is advantageous for the circuit by which the color synchronizing signal is fed to the reference potential side of the switch to contain only passive circuit elements, as in this way the production of amplitude and phase differences between the color synchronizing components present at the two terminals of the switch means may be avoided.

In order that the invention may be readily carried into effect, it will now be described with reference to the accompanying drawings, given by way of example, comprising FIGURES 1 to 4, of which:

Figure 1:
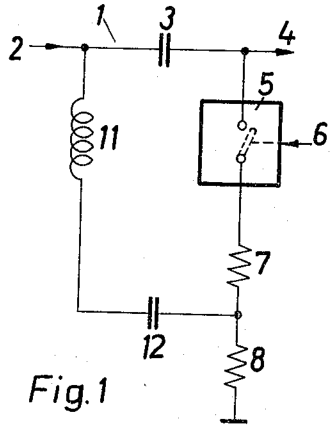
FIG. 1 is a basic circuit diagram of a clamping circuit arrangement according to the invention in which a series-resonant circuit tuned to the color sub-carrier frequency is used to pass a color synchronizing component to the terminal of the switch remote from the signal lead.

In the arrangement shown in FIG. 1 a signal lead 1 has incoming color television signals applied to it at 2. Lead 1 includes a series capacitor 3, the potential of the lead following the capacitor being stabilized at the black level by means of a clamp device 5. The signal with the direct-current component thus reintroduced may be taken at 4 for use as desired. Clamp device 5 may be of any suitable known kind. It is represented for generality as a mechanical switch operated by pulses applied at 6, but may in practice be one of several forms of electronic device known as being suitable for this purpose. The clamp drive pulses used to close the switch during the back porch of the applied television signal may be derived in known manner from the master impulse generator controlling the color television system. It is assumed that the black level of the color television signal is to be brought to earth potential by the operation of the black level clamp. The terminal of switch 5 remote from signal lead 1 is therefore taken to earth by a direct-current path formed in this instance by two-series-connected resistors 7 and 8. The input 2 of signal lead 1 is connected by way of passive circuit elements, comprising in this embodiment the series combination of an inductor 11 and a capacitor 12, with the junction point of resistors 7 and 8. The series-resonant circuit formed by inductor 11 and capacitor 12 is tuned to the frequency of the color synchronizing component, which may be 4.3 mc./s. In contrast to a known arrangement with impedance converters, in which a potential is fed at low impedance to the side of the clamp switch remote from signal lead 1, in the arrangement according to the invention the source impedance for the compensating signal applied to the clamp switch is high, being in every case greater than the value of the resistor 7. This has the advantage that the influence of any transmission distortion upon the color synchronizing component separated from the color television signal by means of the resonant circuit upon the color television signal, owing to the internal impedances of the two signal paths, is reduced. These transmission distortions always appear in the rise and decay of the color synchronizing component.

Figure 2:
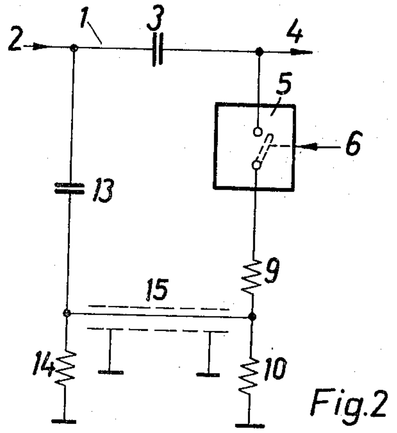
FIG. 2 is the basic circuit diagram of an arrangement in which the color television signal or the color synchronizing component is applied to the side of the clamp switch remote from the signal lead by way of a high-pass filter and a delay line.

In FIG. 2 a signal lead 1 has a color television signal applied to it at 2 as in FIG. 1, and the black level following series capacitor 3 is stabilized at earth potential by means of a black level clamp 5 driven by pulses applied at 6 during the back porch intervals. The application of the color synchronizing component to the terminal of clamp switch 5 remote from the signal lead is in this case effected by means of a high-pass filter, formed by a capacitor 13 and a shunting resistance 14, and a delay line 15 connected from the output of the high-pass filter to the junction of two resistors 9 and 10 which are connected in series from switch 5 to earth.

The two resistors 14 and 10 which terminate delay line 15 have values equal to the characteristic impedance of delay line 15. The cut-off frequency $f_c$ is given by the equation:

$$f_c=\frac{1}{2\pi \cdot C_1 \cdot Z}$$

where $C_1$ is the value of capacitor 13 and Z is the characteristic impedance of delay line 15, should be between 1 and 3 mc./s. for a color sub-carrier frequency of 4.3 mc./s.

Figure 3:
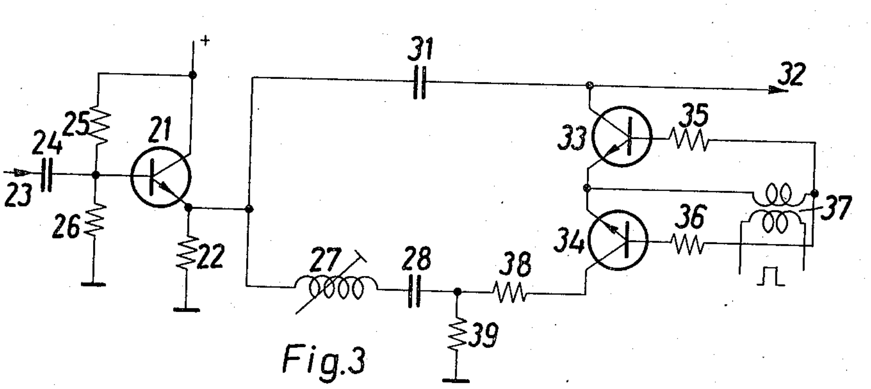
FIG. 3 shows the circuit diagram of a practical embodiment of the arrangement described with reference to FIG. 1.

FIG. 3 shows the circuit diagram of a practical apparatus using the principle described above in relation to FIG. 1. It is assumed that the color television signal to be stabilized is provided by a transistor 21 which is operated in a conventional emitter-follower circuit with an emitter load resistor 22 (e.g. 470 ohms) and to the base of which the color television signal is applied from a lead 23 by way of a capacitor 24 (e.g. 100 $\mu$f.). The appropriate base potential for transistor 21 is supplied by a voltage divider formed by resistors 25 and 26 (each 4.7 kilohms for example) which is connected across the supply. This arrangement is given by way of example only of a suitable signal source, the nature of which does not concern the present invention.

From the emitter of transistor 21 the color television signal passes by way of a capacitor 31 (e.g. 1000 pf.) to an output lead 32. The clamping switch comprises two transistors 33, 34 (e.g. type 2N708) with their collector-emitter paths in series opposition. Clamp drive pulses are applied between the commoned emitters and the respective bases of transistors 33, 34 by way of individual resistors 35, 36 from a pulse transformer 37. The clamp switch also does not form an essential part of the invention and may be of any convenient form.

The side of switch 33, 34 which is remote from signal lead 1 is taken to a reference potential source (earth potential) by way of the series combinaton of two resistors 38, 39 (each 1 kilohm). Between the junction point of resistors 38, 39 and the source of the color television signal (in this case the emitter of transistor 21) there is connected a series resonant circuit formed by an inductor 27 and a capacitor 28, the values of these components being such that the circuit may be tuned to the color sub-carrier frequency by means of the adjustable inductor 27. Suitable values for these components are: inductor 27 —5 $\mu$h. approximately; capacitor 21 —150 pf.

Figure 4:
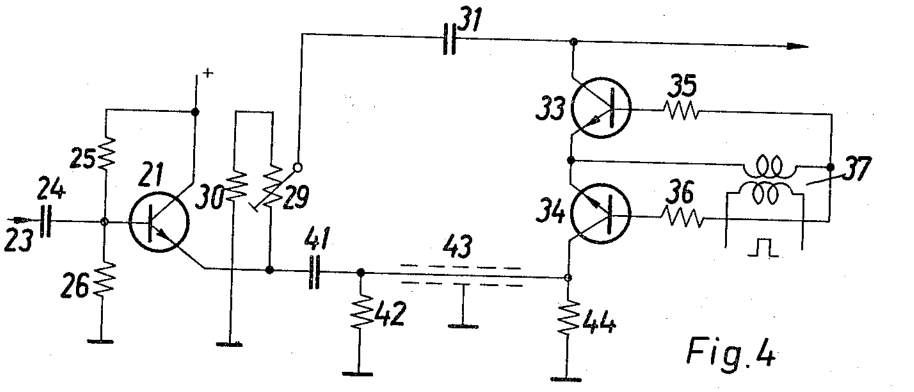
FIG. 4 shows the circuit diagram of a practical embodiment of the circuit arrangement described with reference to FIG. 2.

In FIG. 4 the known parts of the circuit arrangement which do not form essential parts of the invention, the emitter-follower stage including transistor 21 and the clamp switch including transistors 33, 34 are carried out in the same manner as in FIG. 3 and many components therefore carry the same reference numerals. In this case, however, the emitter load of transistor 21 comprises the series combination of a potentiometer 29, from the tapping of which is taken the signal applied by way of capacitor 31 to output lead 32, and a fixed resistor 30. The signal appearing at the emitter of transistor 21 is applied to a high-pass filter consisting of a capacitor 41 (e.g. 100 pf.) and a resistor 42 (e.g. 1.5 kilohms). The phase rotation of the color synchronizing component which is produced by the high-pass filter is compensated by a delay line 43 connected between the junction of capacitor 41 with resistor 42 and that side of transistors switch 33, 34 which is returned to the reference potential (earth potential) by way of a resistor 44. Resistor 44 also forms a terminating resistor for delay line 43, which may advantageously consist of a delay cable (e.g. of type HH 1500$a$) of appropriate length, which in the present embodiment amounts to some 8 cm. Capacitor 41 of the high pass filter has a value such that in conjunction with a shunt resistance having a value equal to half the characteristic impedance of the delay line the desired cut-off frequency is obtained. The resistors 42, 44 therefore each have a value equal to the characteristic impedance of delay line 43, which in the present embodiment is 1.4 kilohms.

A small reduction in signal amplitude results from the components present in the signal path from the source to the bottom of the switch. Potentiometer 29 forming part of the load impedance of transistor 21 allows the magnitude of the color synchronizing components present at the terminals of the switch to be made equal to one another. This arrangement may also be introduced into the arrangement described in relation to FIG. 3, but is not usually necessary in that arrangement, for the reduction in signal amplitude is usually negligible if low-loss components are employed for inductor 27 and capacitor 28.

What is claimed and desired to be secured by Letters Patent is:

1. Color television signal modifying apparatus including in combination: a source of said color television signals including line blanking intervals and color sub-carrier signal components of predetermined frequency occurring within said intervals; an output terminal; an alternating current signal path connecting said source to said output terminal; a source of reference potential; switch means having first and second terminals; a direct connection from said output terminal to said first switch terminal; a direct current path from said second switch terminal to said reference source; switch operating means closing said switch during said line blanking intervals; passive circuit means preferentially transmitting signal frequencies including said color sub-carrier frequency; and a signal path including said passive circuit means applying signal components of said color sub-carrier frequency from said source to said second switch terminal.

2. Apparatus as defined in claim 1 in which said passive circuit means includes in combination: tapped resistance means connecting said second terminal of said switch to said reference source; a series combination of a capacitor and an inductor, said series combination having a resonant frequency equal to the frequency of said color sub-carrier; circuit means connecting signals from said signal source to said series combination; and circuit means applying signals from said series combination to said tapping of said resistance means.

3. Apparatus as defined in claim 1 in which said passive circuit means includes in combination: high-pass filter means having a cut-off frequency below the frequency of said color sub-carrier; said filter means having a predetermined phase shift at said frequency; signal delay means having a phase shift complementary to said filter phase shift; resistance means connecting said second switch terminal to said reference source; and a signal path including the series combination of said filter means and said signal delay means applying signals from said signal source to said second switch terminal.

4. Apparatus according to claim 1 in which said alternating current path includes means operable to vary the attenuation of said color television signals traversing said path.

5. Color television signal clamping means including a source of color television signals including line blanking intervals and color sub-carrier signal components located within said line blanking intervals; an output terminal; an alternating current path connecting said signal source to said output terminal; a source of a reference potential; an electronic switch having two poles; switch actuating means operating to establish a connection between said switch poles during said line blanking intervals; a direct connection from said output terminal to one pole of said switch; resistance means connecting said other pole of said switch to said reference source; passive circuit means preferentially transmitting said color sub-carrier signal components; and a signal path including said passive circuit means from said source to said other switch terminal; whereby said color sub-carrier component appears in like amplitude and phase at both said switch poles.

References Cited by the Examiner

FOREIGN PATENTS 1,139,538 11/1962 Germany.

OTHER REFERENCES

RCA TN No. 60, RCA Technical Notes, RCA Laboratories, Princeton, N.J., 1957.

DAVID G. REDINBAUGH, *Primary Examiner.*

J. A. O'BRIEN, *Assistant Examiner.*